(12) United States Patent
Prum

(10) Patent No.: US 7,867,088 B2
(45) Date of Patent: Jan. 11, 2011

(54) INTERACTIVE GAME SYSTEM USING GAME DATA ENCODED WITHIN A VIDEO SIGNAL

(75) Inventor: Shanon Prum, Yorba Linda, CA (US)

(73) Assignee: MGA Entertainment, Inc., Van Nuys, CA (US)

(*) Notice: Subject to any disclaimer, the term of this patent is extended or adjusted under 35 U.S.C. 154(b) by 863 days.

(21) Appl. No.: 11/804,418

(22) Filed: May 18, 2007

(65) Prior Publication Data

US 2007/0288969 A1 Dec. 13, 2007

Related U.S. Application Data

(60) Provisional application No. 60/802,742, filed on May 23, 2006.

(51) Int. Cl.
G06F 17/00 (2006.01)
(52) U.S. Cl. ......................................................... 463/37
(58) Field of Classification Search .............. 463/37–42
See application file for complete search history.

(56) References Cited

U.S. PATENT DOCUMENTS

| | | | |
|---|---|---|---|
| 4,729,563 A | 3/1988 | Yokoi | |
| 4,767,335 A | 8/1988 | Curt | |
| 4,840,602 A | 6/1989 | Rose | |
| 4,846,693 A | 7/1989 | Baer | |
| 4,949,327 A | 8/1990 | Forsse | |
| 5,021,878 A | 6/1991 | Lang | |
| 5,343,239 A | 8/1994 | Lappington | |
| 5,423,555 A | 6/1995 | Kidrin | |
| 5,488,411 A | 1/1996 | Lewis | |
| 5,655,945 A | 8/1997 | Jani | |
| 5,977,951 A | 11/1999 | Danieli | |
| 6,008,802 A | 12/1999 | Iki | |
| 6,084,638 A | 7/2000 | Hare | |
| 6,097,441 A | 8/2000 | Allport | |
| 6,281,939 B1 | 8/2001 | Del Castillo | |
| 6,415,439 B1 | 7/2002 | Randell | |
| 6,497,412 B1 | 12/2002 | Bramm | |
| 6,565,441 B1* | 5/2003 | Hames et al. | 463/39 |
| 6,701,060 B2 | 3/2004 | Yuen | |
| 6,742,188 B1 | 5/2004 | Del Castillo | |
| 6,765,950 B1 | 7/2004 | Nuytkens | |

(Continued)

*Primary Examiner*—Ronald Laneau
(74) *Attorney, Agent, or Firm*—Intellectual Property Law Offices of Joel Voelzke, APC

(57) ABSTRACT

An interactive game system includes a specially prepared DVD game disk with video images such as of a game show, and game data and instructions encoded within the VBI data on the disk. A game control unit receives all of the video signals recorded on from the DVD including both video images and the VBI data, extracts the VBI data, and uses the VBI data in conjunction with a plurality of handheld player inputs to allow users to select and answer game questions. The game control unit keeps track of whether the player inputs were correct or incorrect, the players' cumulative scores in accordance with their answers, and displays the players cumulative scores as video overlay on top of the recorded video images to be sent to a video display such as a standard television set. The game control unit controls chapter selection on the user's particular DVD player model via a programmable wireless transmitter, and performs other logic, video, and audio generating and processing functions to allow a highly interactive game playing experience for multiple players.

22 Claims, 5 Drawing Sheets

U.S. PATENT DOCUMENTS

| | | | |
|---|---|---|---|
| 6,879,347 B1 | 4/2005 | French | |
| 6,921,333 B2 | 7/2005 | Taguchi | |
| 6,937,289 B1 | 8/2005 | Ranta | |
| 6,997,852 B2 * | 2/2006 | Watterson et al. | 482/1 |
| 7,115,032 B2 | 10/2006 | Cantu et al. | |
| 7,468,684 B2 * | 12/2008 | Chiu | 341/51 |
| 7,537,546 B2 * | 5/2009 | Watterson et al. | 482/8 |
| 2004/0013406 A1 | 1/2004 | Barton | |
| 2004/0025190 A1 | 2/2004 | McCalla | |
| 2004/0031058 A1 | 2/2004 | Reisman | |
| 2004/0045038 A1 | 3/2004 | Duff | |
| 2004/0052499 A1 | 3/2004 | Sing | |
| 2004/0117840 A1 | 6/2004 | Boudreau | |
| 2004/0117858 A1 | 6/2004 | Boudreau | |
| 2004/0127335 A1 * | 7/2004 | Watterson et al. | 482/8 |
| 2004/0132533 A1 * | 7/2004 | Leifer | 463/42 |
| 2004/0167872 A1 | 8/2004 | Shteyn | |
| 2005/0015815 A1 | 1/2005 | Shoff | |
| 2005/0015817 A1 | 1/2005 | Estipona | |
| 2005/0018756 A1 | 1/2005 | Nuytkens | |
| 2005/0111823 A1 | 5/2005 | Dureau | |
| 2005/0246747 A1 | 11/2005 | Braun | |
| 2006/0068915 A1 * | 3/2006 | Okada | 463/42 |
| 2006/0084507 A1 * | 4/2006 | Miyazaki | 463/43 |
| 2008/0086749 A1 * | 4/2008 | Goldberg et al. | 725/68 |
| 2008/0120676 A1 * | 5/2008 | Morad et al. | 725/127 |
| 2009/0270226 A1 * | 10/2009 | Watterson et al. | 482/4 |

* cited by examiner

INTERACTIVE GAME SYSTEM USING GAME DATA ENCODED WITHIN A VIDEO SIGNAL

CROSS-REFERENCE TO RELATED APPLICATIONS

This application claims priority from U.S. Provisional Patent Application No. 60/802,742 filed May 23, 2006.

BACKGROUND OF THE INVENTION

1. Field of the Invention

This invention relates to the field of interactive electronic game devices. More particularly, this invention relates to the field of interactive, multiple-player electronic game devices.

2. Description of Related Art

Video game consoles, such as a Sony Playstation, Microsoft's XBox, and Nintendo GameCube, allow a user or multiple users to play a video game using a standard television set. A user loads a game by inserting a cartridge, magnetic dish, or data-formatted CD-ROM/DVD into the game console. The game console, using its own cartridge adaptor, disk drive, or optical disk reader, reads the data from the media and sends it directly to its internal components for processing and storage. Even though a user may have a working, capable DVD player attached to his or her television set, a typical video game console does not employ its use.

The National Television System Committee (NTSC) Electronics Industry Alliance RS-170a standard television signal is a common standard in the United States for the signal that travels into a television set's input port. In an NTSC signal, there is a time interval called the Vertical Blanking Interval (VBI). This is the interval during which the television set's electron gun conducts a vertical retrace (i.e., the electron gun moves from the bottom of the screen at the end of a vertical trace back up to the top of the screen to get ready to scan a new image onto the phosphor). During this interval, image data is not being sent because the electron gun is performing the vertical retrace. However, the VBI interval can be used to send data within the signal. The data sent during the VBI interval is called the VBI data.

Although cathode ray tubes with electron guns are largely being supplanted by liquid crystal display (LCD) and plasma technologies which do not require a VBI, the NTSC signal format remains the same.

By Federal Communications Commission (FCC) regulations, in a standard television broadcast this VBI interval is used to send closed caption data for the hearing impaired. This is not the same as subtitle data for a movie on DVD. Therefore, in a standard television broadcast, the VBI data is used for closed caption data for hearing impaired persons.

Game systems have been developed to encode game data as VBI data, and then to extract that data. U.S. Pat. No. 5,343,239 issued to Lappington describes a system incorporating a settop decoder which uses VBI data. The settop decoder additionally includes a handheld terminal with which it communicates. The handheld terminal has a message display and buttons for a user to input responses. Although a live broadcast may be received, Lappington discloses a video tape recorder used to play a source program of interest. A user can play interactively with the taped program as a game.

SUMMARY OF THE INVENTION

The present invention uses VBI data to carry game data for use with a game console, so that a standard DVD player and television set can be combined with a special DVD disk and the game console for interactive amusement. Multiple interactive game units communicate with the game console, or VBI extraction unit, so that users may simultaneously interact with the game console. As used herein, the term "game console" shall be interpreted broadly to include settop boxes, video game consoles, personal computers, or similar types of electronic devices for processing interactive game instructions. As used herein, the term "DVD" shall be interpreted broadly to include any digital versatile disk or digital video disk, whether factory pressed or recorded, and their successors such as, but not limited to, Sony/Panasonic's Blu-ray Disk, Toshiba's HD DVD, and Maxell's Holographic Versatile Disk.

By taking advantage of DVD menu protocols and the NTSC VBI data pathway, the invention can use a standard, off-the-shelf DVD player in conjunction with minimal extra components to create an interactive, compelling, and television-land like game experience. By incorporating multiple handheld terminals, the invention allows users to simultaneously interact with the game while maintaining secrecy in answers and/or scores. Multiple handheld terminals allow buzzer-type or first-to-complete type games between players. As used herein, the term "handheld terminal" includes personal electronic display and input devices which may or may not actually be held in one's hand.

In a first illustrative embodiment the interactive gaming system of the present invention includes an interactive game unit or control unit that performs several special functions. The game unit extracts the game data including associated machine instructions encoded within the VBI data of the video signal and uses that data to create a video overlay and selectively place that video overlay onto the video signal before forwarding that video signal to the television set, monitor, or other external display for display thereon. Second, the game unit receives signals from a remote control (RC) transmitter associated with the user's DVD player, determines what RC protocol is being used, and programs itself to transmit RC signals using that RC protocol. The game unit has a wire attached to it with an infrared transmitting (IR TX) diode at the free end of the wire. The user tapes or otherwise affixes the IR TX diode to the front face of the DVD player near the DVD player's IR receiver, or at least sets the IR TX diode in close enough proximity to the DVD player's IR receiving port so that the game control unit can send commands to a DVD player. The game unit thereby has the ability to send various commands to the DVD player and thereby control playback of selected portions of the DVD. The interactive game unit receives IR signals from a plurality of handheld user input devices. Depending on the particular state or stage of the game or its setup, the handheld input devices function as either inputs for users to control the cursor function, to activate the Enter function, and/or other features on the DVD player as game control inputs, or the handheld input devices function as player buzzers or the like.

When the handheld user input devices are to function as DVD controls, the game unit receives the player input such as a left arrow key input, recognizes based on the state of the game that the handheld user input device should function as a DVD control, and in response transmits a corresponding command through the IR TX diode which is taped to the front of the DVD player.

On the other hand, when the handheld user input devices are to function as buzzers or the like, the game unit receives the player input and interprets that command as being an input to the game controller and not as an input to the DVD Player. The game unit therefore does not send a command to the DVD player, but instead processes the player input such as by awarding or subtracting points from the player's score accordingly.

In the illustrative embodiment, after the control unit programs its IR TX port for the protocol corresponding to the user's particular DVD player and remote control, the DVD the TV, in response to video signals recorded on the game DVD and received from the DVD player, displays various games and options for a player(s) to select from among. After the game and options are selected, a trivia game board is displayed on the TV screen. The first player uses the buttons on his buzzer in association with the on-screen cursor to select which category and which question within that category to select, for example, the category of "Foods that Begin with the Letter Q" for $200. The DVD then plays the chapter or other division unit on the DVD in which the selected question is displayed and the host of the show reads the question aloud. The first player to "buzz in" by pressing a button on his buzzer is allowed to answer the question. The DVD may display multiple choices for the player to choose from among, and the player may select his answer by using the cursor buttons on his buzzer to select his answer from among the choice of answers displayed.

When the player chooses his answer, the control unit causes a signal that indicates whether the answer was correct or incorrect. If the answer was correct, for example, the control unit could cause a bell noise to sound either through the TV or through a separate sound speaker, and/or could cause the voice of the host to say, "That is correct" and/or could cause the word "CORRECT" to appear on the screen, and/or could cause a green light on the control unit to light up. If the answer was incorrect, the control unit could cause a buzzer to sound either through the TV or through a separate sound speaker, and/or could cause the voice of the host to say, "This is incorrect," and/or could cause the word "INCORRECT" to appear on the screen, and/or could cause a red light on the control unit to light up.

The game unit can also cause the voice of the host to provide other game control directions, such as, "Player 1, please choose the next question" if player 1 answered the question correctly, or "I'm sorry, you did not answer the question within five seconds. Do player 2 or player 3 wish to answer the question?"

If the player answered the question correctly, then the control unit adds $200 to that player's score, causes the players' cumulative point totals to be displayed on the screen, and then allows the player can select the next question to be read. If the player's answer was incorrect, then the control unit deducts $200 from that player's score, causes the players' cumulative point totals to be displayed on the screen, and then either reads the next question in sequence or allows a different player to choose the next question to be read. The game is played to completion, such as when all of the questions have been read, or when a player reaches a predefined winning point total, or through other common game ending events.

The control unit causes video to be displayed on the screen by a combination of causing, through the IR TX diode, the DVD to advance to the desired next chapter, and/or generates video overlay onto the video signal coming from the DVD player. The control unit can switch between raw video (e.g., video as it comes from the DVD player) and processed video (e.g., video including an overlay produced by the control unit), or possibly video overlay by itself. The control unit can cause sound to be played through the TV set by adding the desired sound signal to the audio signal coming from the DVD player and going out to the TV set.

In a second embodiment, the game control unit does not have the capability to send commands to the DVD player. Instead, the players use the DVD remote control to cursor to the desired game, options, and questions, and otherwise control the playback of the DVD on which the game is programmed. In this embodiment the buzzers may also be equipped with multiple choice selection buttons such as an "a" button, a "b" button, a "c" button, and a "d" button.

In a third embodiment, the game controller does not overlay point totals or other information onto the displayed video. Instead, each player has a handheld unit that includes a buzzer button and a display. The game unit sends the indication of a correct or an incorrect answer and cumulative scores to the handheld units preferably using wireless transmission. The handheld units then display the players' scores and may provide additional prompts or other interaction with the players.

The present invention uses the rapid, random access ability of DVDs to make a game functionally interactive. Taped programs such as used in prior art devices have a delay when fast-forwarding or rewinding to different scenes which can bore or frustrate users. Embodiments of the present invention allow a user to select a video scene and instantly play it. The machine instruction data that provides software instructions or data to the game control unit is encoded in the VBI of the scenes so that it is inherently associated with the correct scenes.

Exemplary embodiments of the invention will be further described below with reference to the drawings, in which like numbers refer to like parts.

DETAILED DESCRIPTION OF THE PREFERRED EMBODIMENTS

Figure 1:
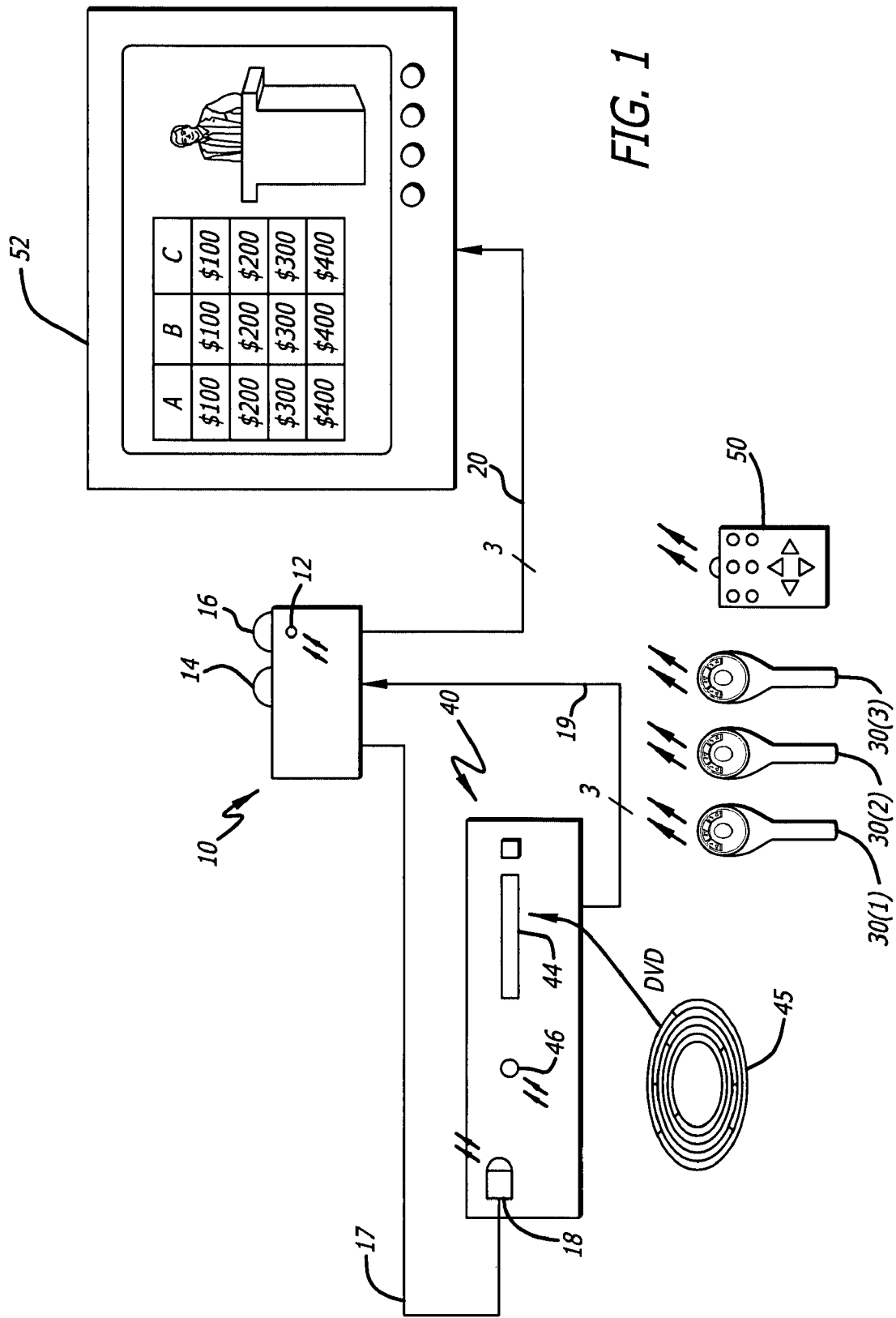
FIG. 1 is hardware connection diagram of an illustrative embodiment of the interactive game system of the present invention.
Figure 4:
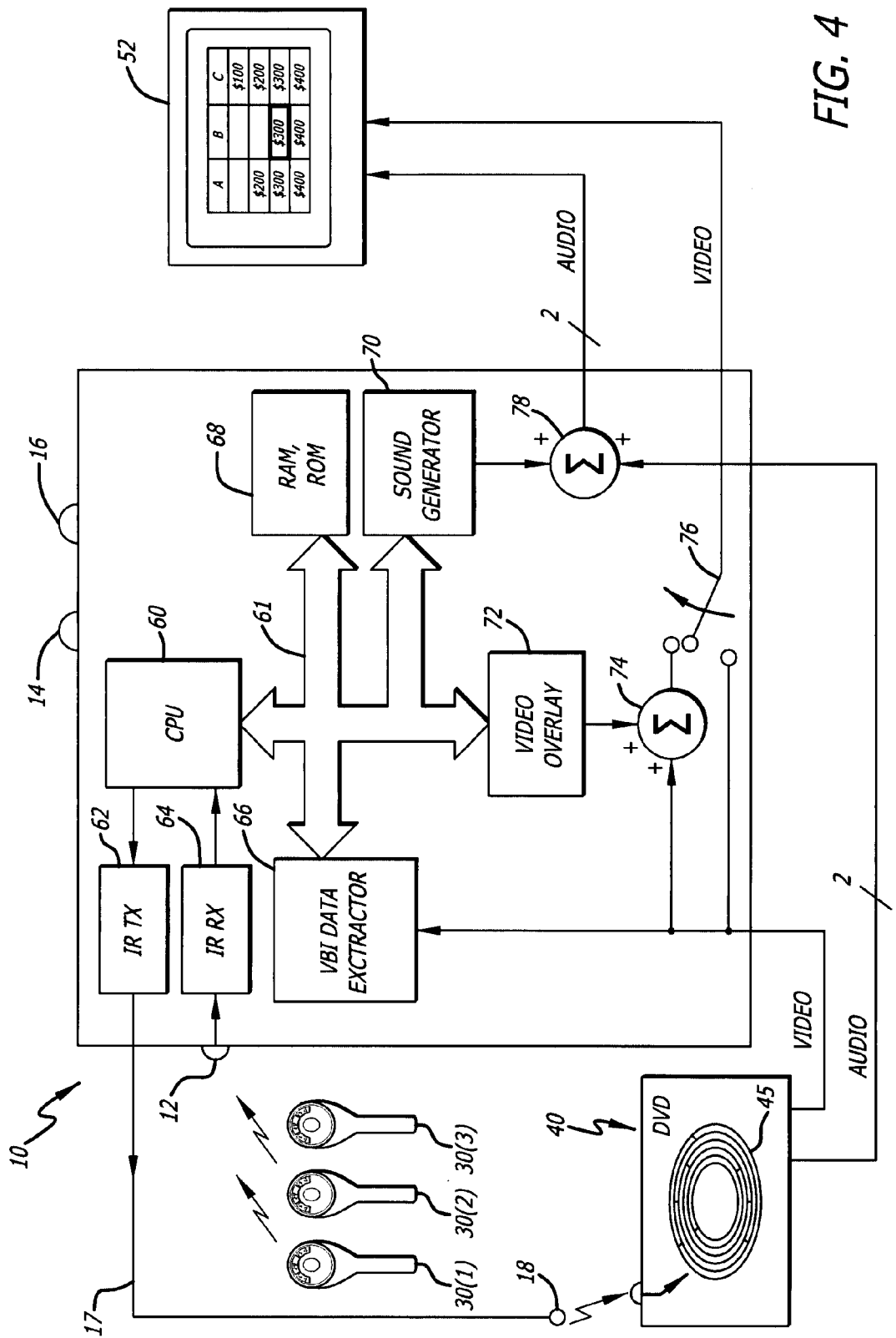
FIG. 4 is a conceptual functional diagram of the system of FIG. 1.

FIG. 1, is a hardware connection diagram of an illustrative embodiment of the VBI/DVD gaming system of the present invention. The system includes a game control unit 10, one or more player input devices or "buzzers" 30(1), 30(2), and 30(3), and a specially prepared video disk 45 (FIG. 4). Game control unit 10 and buzzers 30 interface with a video playback device such as a standard DVD player 40, the DVD player's associated remote control 50, and a display device such as a standard television set 52. The signal cables for routing video and audio signals include cable sets 19 and 20. Each of cable set 19 and 20 includes one video signal cable, a left side audio signal cable, and a right side audio signal cable, for standard audio/video connections using standard audio/video cabling.

Game control unit 10 has an infrared receiver (IR RX) 12 which defines an input port for receiving signals from both DVD remote control 50 as well as from player buzzers 30. Game control unit 10 may also include signal lights such as green light 14 that lights up when a player's answer was correct, and red signal light 16 that lights up when a player's answer was incorrect. Game control unit 10 includes flexible signal wire 17 that carries a transducer or transceiver 18 for communicating with DVD player 40 and defines a wireless signal output port. In the illustrative embodiment which uses a standard DVD player 40, the transducer is an infrared transmitting (IR TX) diode for sending infrared signals to the infrared receiver 46 of DVD player 40, that is, to DVD player 40's wireless input port. DVD player 40 includes a tray 44 for receiving the specially prepared video disk 45 to be played. Each of the buzzers 30 includes an IR transmitter for communicating with game control unit 10.

Figure 3:
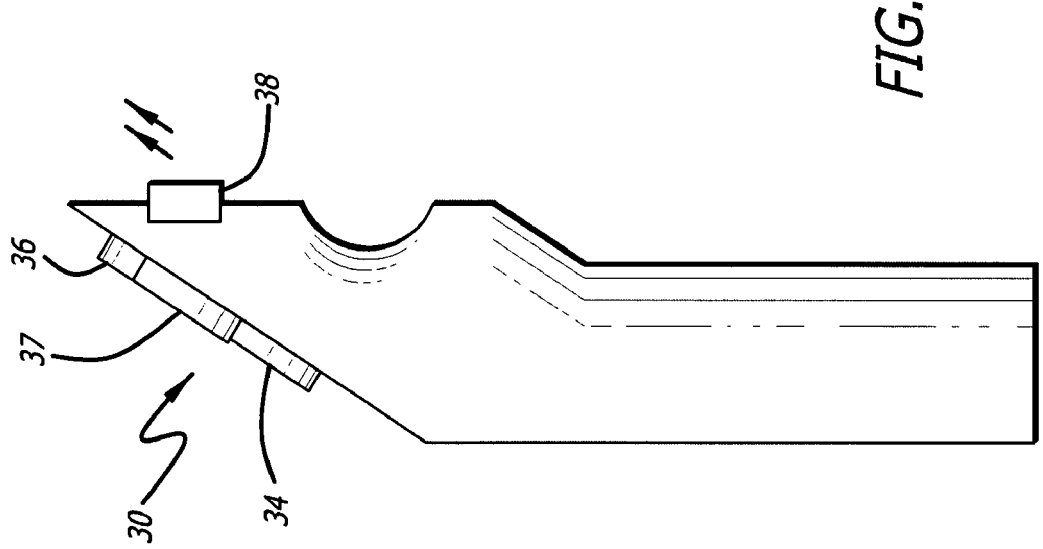
FIG. 3 is side elevation view of the handheld player input device 30 shown in FIG. 1.
Figure 2:
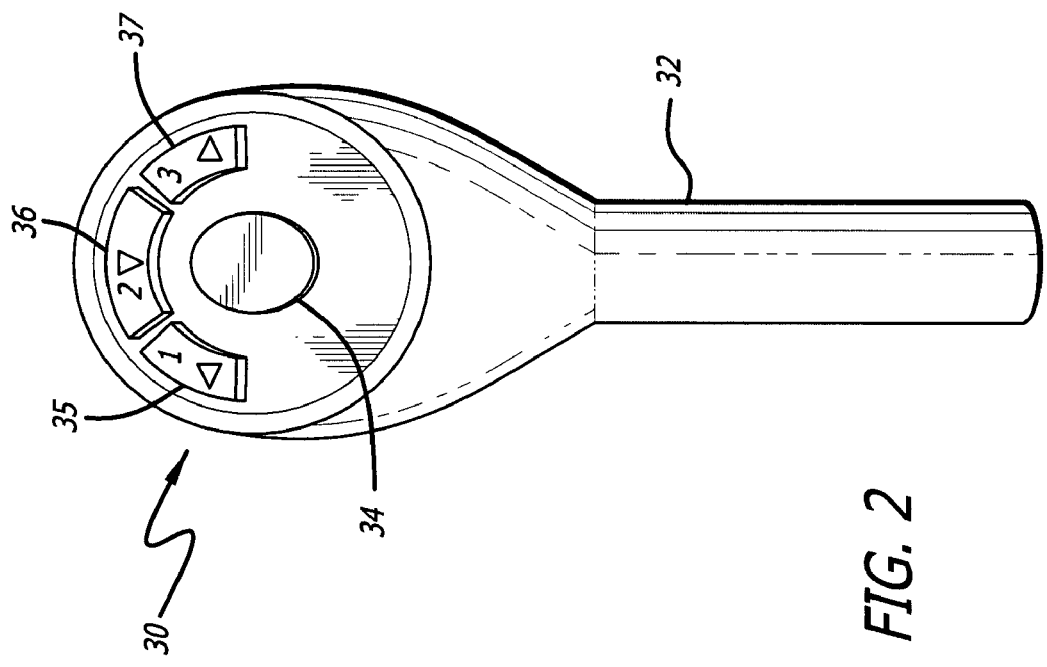
FIG. 2 is a front plan view of the handheld player input device 30 shown in FIG. 1.

FIGS. 2 and 3 are close-up views of one of the player buzzers 30. In the illustrative embodiment shown buzzer 30 has a body portion 32 and a plurality of player input buttons including an ENTER button 34, a combination NUMBER 1 and LEFT ARROW button 35, a combination NUMBER 2 and DOWN ARROW button 36, and a combination NUMBER 3 and RIGHT ARROW button 37. An IR TX diode 38 transmits the button selections to game control unit 10. In the illustrative embodiment the infrared transmission port transmits the desired signal as a 38 Khz square wave (on/off pulses), with a 25% duty cycle designating a "0" and a 75% duty cycle designating a "1." Other well known protocols could also be used.

FIG. 4 is a conceptual functional diagram of the illustrative embodiment shown in FIG. 1. FIG. 4 is presented for illustrating some of the major hardware functions of the system; it is not intended to be an accurate electrical schematic or hardware architecture diagram. As one skilled in the art of electrical circuit design will appreciate, there are many different possible ways to implement the invention disclosed herein using various choices of hardware and software, programmable logic, custom or semi-custom integrated circuits, and other tools available to electrical circuit designers. The implementation details are largely matters of routine design choice.

As illustrated in FIG. 4, game control unit 10 includes a central processing unit (CPU) 60, random access memory (RAM) and read only memory (ROM) grouped together as Memory 68, an infrared transmission port 62 sending signals along wire 17 to IR TX diode 18, and an infrared reception port 64 receiving inputs from infrared receiver 12. VBI Data Extractor 66 receives video data from a standard video signal and makes the game data and machine instructions encoded within the video signal available to CPU 60 via bus 61.

DVD player 40 plays specially prepared video disk 45 which contains video and audio, as well as game data and machine instructions encoded within the VBI.

Video overlay generator 72 generates a video overlay for superimposing or overlaying onto the video signal from the DVD player 40. Alternatively, control unit 10 could simply switch from sending either raw video or generated but not overlayed video to television set 52, although superimposing generated video onto raw video generally allows for richer and more versatile text and graphics generated easily. Using programming instructions stored within the ROM, in response to player inputs from buzzers 30(1) through 30(3), and in accordance with the progressing of the game, CPU 60 controls which portion of DVD 45 is played and when. CPU 60 also generates data used by video overlay module 72 to produce a video overlay which is selectively added via summer circuit 74 to the raw video signal received from DVD player 40, according to the state of video switch 76 which is controlled by CPU 60 according to the progressing of the game, player inputs, and other factors. CPU 60 further generates sounds to be played via sound generator 70. The sound is shown being added to the left and right side audio signals received from DVD player 40 via summer circuit 78 and sent to television set 52. Alternatively, game control unit 10 could generate sound using an internal speaker, or through a separate external speaker connected to game control unit 10.

In the currently anticipated commercial embodiment, the CPU is contained within a 16-bit video and audio processor chip. A video decoder converts the incoming NTSC or other video signal to digital and presents it to the video processor chip which then processes the video and the data encoded within the VBI signal, and produces the output video signal and an audio output signal for sending to the television set.

DVD 45 is a specially prepared DVD that includes both standard video and audio, and contains game data and machine instructions encoded as VBI data that will be used by game control unit 10 to control the game.

A typical operating sequence is as follows. When video disk 45 is placed into DVD player 40, player 40 begins playing the disk. Player 40 begins streaming chapter 1 of the video program recorded on DVD 45 to game control unit 10. As used herein, the term "chapter" refers to any predefined portion of the recorded video program. Switch 76 is initially set to send unprocessed video to television set 52.

First, the user selects the desired game and options. The screen displays the different games that are available such as episodes 1-20, and options within each game such as the difficulty setting for each game (difficult, medium, or easy), and the number of players. A player uses remote control 50 to move the on-screen cursor and make a game selection.

Figure 5:
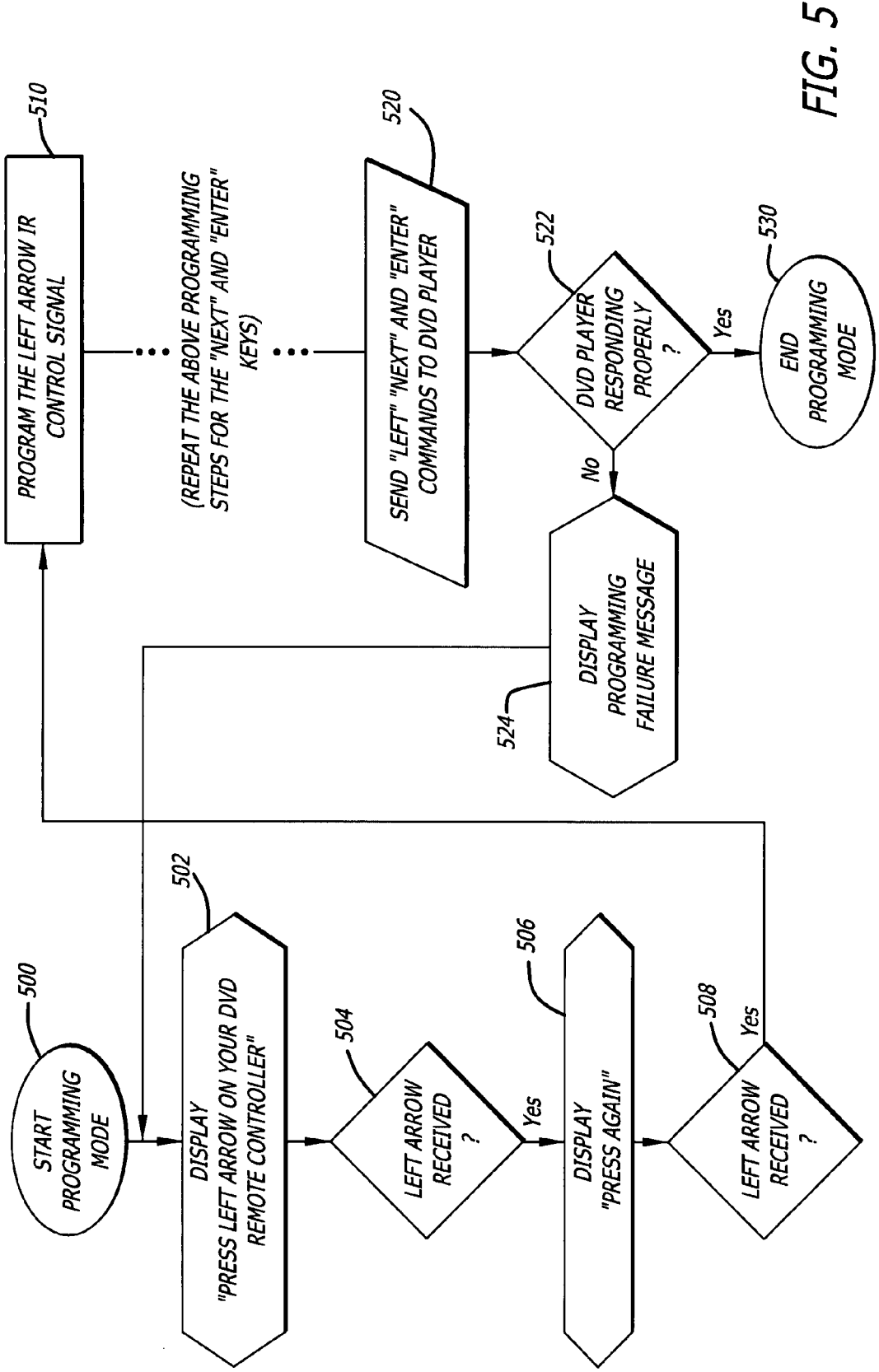
FIG. 5 is a flow diagram of the process for programming game control unit 10 shown in FIG. 1.

Second, the user must program game control unit 10 to communicate with the user's particular DVD player. FIG. 5 is a flow diagram showing the steps of the programming process. Instructions displayed on television set 52 tell the user to hold his DVD remote control 50 close to the IR receiver 12 of game unit 10 and press the LEFT ARROW button on remote control 50. Game control unit 10 will then receive the signal transmitted by remote control 50, and will recognize the received signal and its protocol. Game control unit 10 then sends a signal via IR TX diode 18 to the DVD player 40 to advance to the next chapter, which causes the instruction "Press Again" to be displayed on television set 52. The pressing of the remote control button twice is so that game control unit 10 can recognize whether DVD player 40 and its associated remote control communicate using only a single signal for each button, or whether the units communicate using an A/B sequence (one signal at the first press, then a second signal at the second press) as some DVD players and their remote control units do. Once game control unit 10 has successfully received the signals for two presses of the remote control button, game control unit 10 tells DVD player 40 to advance to the next chapter on DVD 45.

The above sequence is repeated for the NEXT button (also knows as the Chapter or Skip button), and the ENTER button. The sequence could be repeated for any other buttons on remote control 50 which game controller 10 will emulate.

Game control unit 10 is now programmed so that it knows the IR transmission protocols including sequences and other encoding details used by DVD player 40, and can command DVD player 40 as desired using the protocol detected. That is, game control unit 10 may now act as a signal formatter for receiving the IR signals from the players' buzzers or other input devices, and translating those signals into the format that DVD player 40 will recognize. Game control unit 10 is preprogrammed to recognize the four buttons 34, 35, 36, and 37 on each of the three player buzzers 30(1), 30(2), and 30(3), so control unit 10 can now receive a button input from one of the buzzers 30 and send the corresponding arrow (cursor control) or ENTER command to DVD player 40 for any of the three buzzers. Control unit 10 also recognizes which player is pressing the button on his buzzer because each of the three buzzers transmits a different code. In the exemplary embodiment, when a player presses one of his buzzer buttons that buzzer will first transmit a sync code, then an buzzer identification code that identifies the buzzer as buzzer number 1, buzzer number 2, or buzzer number 3, and then a button identification code to identify which of the four buttons 34, 35, 36, or 37 that the player pressed.

At this point, programming is finished and the game begins. When a player presses a button on his buzzer, what is actually happening is that the buzzer sends an IR signal to game control unit 10, which then sends the corresponding command to DVD player 40 through IR TX diode 18. Control unit 10 commands DVD player to play the DVD chapter at which the game sequence begins. In the case of a trivia game, the television screen shows the host walking out to his podium next to the game board and theme music playing. The host takes his place behind the podium, reads the rules of the game, and asks the players in turn to press their buzzers to verify that all of the players' buzzers are functioning properly. When player 1 presses her buzzer, game control unit 10 receives the ENTER button signal from buzzer 1 and causes the words "PLAYER 1" to flash on the screen via the video overlay function 72 and a bell to ring via audio generator 70. The same sequence occurs for the remaining number of players selected. FIG. 1 shows three player input buzzers 30(1), 30(2), and 30(3), but the game could allow for any number of players provided that the game set provides enough buzzers or is expandable in some fashion.

The game itself begins now. Control unit 10 commands DVD player 40 to jump to the first chapter in the game itself. The game board appears on the screen. In an illustrative trivia game, the game board will include several categories of questions and several questions within each category. FIG. 1 shows the game board as consisting of three categories A, B, and C, with questions of value $100, $200, $300, and $400 for each category. The categories could be, for example, "Foods that begin with the letter 'Q'," or "Academy Award Winning Movies," or any other categories. Any type of game board could be displayed. The game board may be generated by CPU 60 and video overlay function 72, or other video processor, in response to the VBI data, with switch 76 being set to the overlay position. Alternatively, the game board may be produced as video signals from DVD player 40. The sound of the host is then heard reading the categories on the game board or otherwise introducing the players to the particular game. DVD player 40 then plays the next DVD chapter which is a closeup of the first question as it is revealed, with the sound of the host reading the question. Once the host has finished reading the question, the words "Buzz in now" will appear on the screen, generated by CPU 60 as video overlay. As soon as the words "Buzz in now" appear on the screen, game control unit 10 will accept a player buzzing in. The first player to buzz in by pressing the ENTER button on his buzzer is selected. An audible sound indicates that a player has buzzed in. If player 3 is the first player to buzz in, the words "Player 3" appear on the screen or other indication that player 3 has buzzed in, and the other player inputs are blocked out. Multiple choice answers now appear below the question on the screen, and player 3 uses the "1," "2," or "3" buttons on his buzzer to select his answer, or cursors to the selected answer and presses the ENTER button. Alternatively, instead of using a multiple choice formats, players could be prompted to enter their answers through another means such as entering their answers on a keyboard which may be either handheld or onscreen.

If player 3 answered the question correctly, game control unit 10 activates green light 12, produces an audio sound of a bell and the sound of the host saying, "That is correct," and CPU 60 implements scoring logic by adding the point value of the question (e.g., $100) to player 3's cumulative score. CPU 60 generates instructions on the screen telling player 3 to select the next question, and the host says, "Player 3, please select." Player 3 then uses his buzzer buttons to select the next question.

If player 3 answered the question incorrectly, game control unit 10 activates red light 12, produces an audio sound of a rejection buzzer, and the sound of the host saying, "That is incorrect," and CPU 60 deducts the point value of the question from player 3's cumulative score. Control unit 10 then blocks player's 3 buzzer and unlocks the buzzers of players 1 and 2, and the voice of the host invites players 1 and 2 to answer the question if they can. If no player answers the question correctly, the last player to provide a correct answer is invited to select the next question, or game control unit 10 selects the next question randomly. The player selects the next question by using his buzzer as a cursor control, and pressing ENTER when the cursor is over the desired question.

Before the next question is revealed and read, CPU 60 generates a score board displaying the players' cumulative scores. The score board is shown on the display screen by switching in the generated video overlay onto the video signal. CPU 60 also generates the game board, indicating which questions have already been used and which question has been selected for reading next. FIG. 4, for example, shows that questions A-for-$100, B-for-$100, and B-for-$200 have been read. Question B-for-$300 is highlighted or flashing indicating that a player has selected question B-for-$300 to be read next. DVD player 40 then moves to the DVD chapter which corresponds to the selected question being revealed and read.

In accordance with a well known trivia game, at certain times during the game the players may be required to place wagers on the next question that will be revealed, before that question is revealed. CPU 60 may randomly select which question will be subject to the before-question wager, and the display screen advises players that they need to place their wagers. Each player in turn uses the cursor keys on his buzzer to select his wager amount. The question is then read.

The game is completed when all of the questions on the game board are revealed. Alternatively, the game may be completed when one player reaches a predetermined winning point total, or after a given period of time. Many variations are possible in accordance with well known games and variations thereof.

When the game is completed, CPU 60 generates and causes to be displayed the score board showing the players' cumulative totals, with the winning player's score highlighted, and the host announcing, "Player 1, you are the winner" along with the winner's point total. CPU 60 thus implements both game control logic and scoring logic in order to control the game, and to selectively activate predefined portions of a prerecorded video program to be played by DVD player 40 which would typically be external to game control unit 10. As used herein, the term "points" refers broadly to any units by which a player score is kept, whether the score is displayed to the players as points, dollars, or other units.

At the beginning of the game players may also be invited to enter their names. If players enter their names, then the scoreboard showing the players' names along with their respective scores will be generated by CPU 60 as video overlay.

The foregoing game description represents merely one possible game that can be played using the system. Many different games can be played using the interactive features and capabilities disclosed herein. Different numbers of players can play, using respective input devices.

Whether a particular on-screen graphic is recorded as video on DVD 45 or is generated as an overlay by game control unit 10, and whether a particular sound is recorded on DVD 45 or generated by game control unit 10, are largely a matters of choice. Because of the many variations possible for how the game board will look after several questions have been read, and the many variations possible in the players' cumulative scores, it is generally desirable to have the game board and the score board generated by game control unit 10 as video overlay.

CPU 60 can obtain some of its machine instructions (software or firmware) from the ROM within memory 68 within game control unit 10. The ROM could also be replaced with Flash memory or other writeable non-volatile memory. The ROM could also be replaced via a game cartridge chip that is inserted into a memory cartridge slot within game control unit 10. If the memory is writable, game control unit 60 could be provided with a USB port or other means for conveniently reprogramming the memory so that the game control unit 10 can be made compatible with additional games with new features in the future, and new IR protocols for future types of DVD players and remote controls or other video playback devices in the future. Additionally, CPU 60 could obtain not just the data for the particular game being played from the VBI data encoded within game disk 45, but could also obtain software instructions for conducting and scoring the game, or new IR protocol data for new video playback devices. The choices are primarily design tradeoffs to be made based on the amount of flexibility and forward compatibility desired, cost, development time, time to market, and other well known considerations.

It is not strictly necessary that control unit 10 overlay players' scores and other generated video information onto the video signals sent to display 52. Instead, control unit 10 could have its own display such as an LCD display built into the unit for displaying the players' scores and other information, or control unit 10 could communicate with a separate, dedicated display. Overlaying video, however, is preferable for minimizing hardware costs and for ease of viewing of the scores and other generated video. Similarly, other embodiments such as disclosed herein could employ a display integral with the control unit, or other display, rather than overlayed video.

In a second embodiment, the game control unit does not have the capability to send commands to the DVD player. Instead, the players use the DVD remote control 50 to cursor to the desired game, options, and questions, and otherwise to control the playback of the DVD on which the game is programmed. This embodiment would be somewhat more cumbersome to play because the players would need to switch from using their buzzers 30 to using remote control 50 and back again, and is therefore currently considered to be less desirable.

Figure 6:
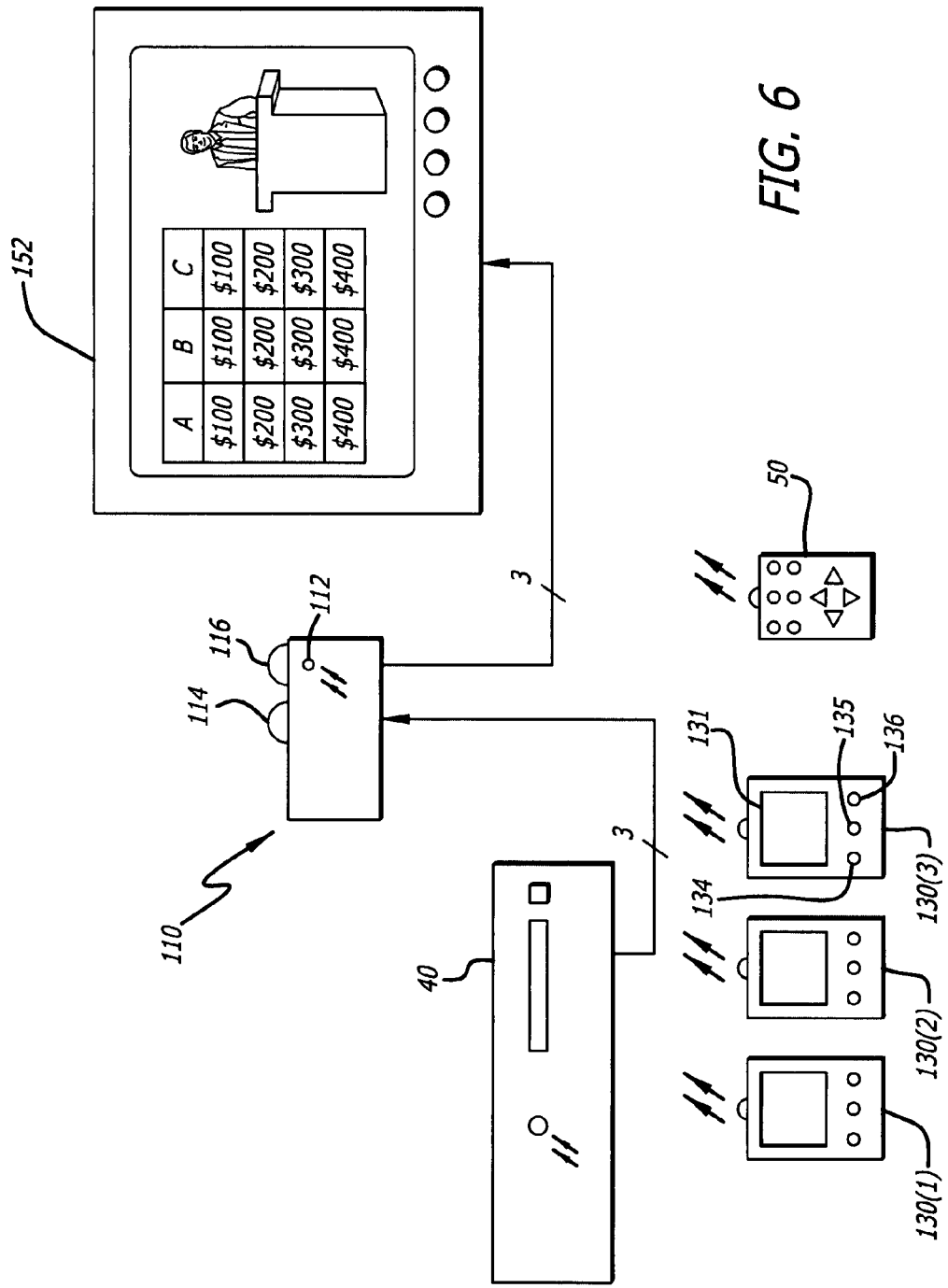
FIG. 6 is a hardware diagram of a third illustrative embodiment of the present invention.

In a third embodiment shown in FIG. 6, the game controller 110 need not overlay point totals or other information onto the displayed video. Instead, each player has a handheld interactive game unit 130 that includes a display 131 as well as player input buttons such as 134, 135, and 136. The game unit 110 sends the indication of correct or an incorrect answer and cumulative scores to the handheld units 130(1), 130(2), and 130(3) preferably using wireless transmission. The handheld units display the players' scores and may provide additional prompts or other interaction with the players. This embodiment may be used either with a game control unit 110 that includes DVD player control means such as IR TX means 17 and 18 as in the first embodiment, or with a game control unit that does not have a DVD player control means and therefore relies upon the players using DVD remote control 50 for chapter selection as in the second embodiment. Still further, game controller 110 could generate video overlay, as well as send additional display signals to displays 131 of the different players' displays. Generating multiple displays in that manner would allow a game to be played in which each player is allowed to see a master display, and in addition each player views his own private display containing display information for his eyes only, such as a simulated hand of cards.

In a fourth embodiment, the game control unit 10 or other device with VBI extraction capabilities could extract VBI data and transmit that data to an animated object such as a first doll using wired or preferably wireless transmission. The VBI data sent to the first doll could contain instructions or data that would cause the doll to speak, wave, sing, dance, or otherwise react in accordance with the video program being displayed. For example, the VBI extraction unit could extract from the VBI and send to the doll VBI data that would cause the doll to make "peanut gallery" type comments to a movie being played. Additionally, the system could be provided with a second doll that receives data intended for the second doll in a similar manner, with the two dolls making interactive comments about the movie being played. Still further, the dolls could be equipped with radio frequency identification (RFID) sensors or other remote sensing means that would allow them to sense the presence and identity of nearby objects, such as the identities of all of the different dolls in close proximity, and interact with those dolls or other play objects according to both the video program being displayed on the TV set as well the presence and characteristics of those other objects. For example, one of the dolls could say at a predefined sequence during a movie, "Hey, Elmer, hand me that wrench over there, will you?"

In yet a fifth embodiment, the system could include a video or still camera that would capture the facial and/or body image of each individual present during an initialization sequence. The controller could then overlay the person's facial and/or body image into a scene being played using conventional blue screen or green screen technology. The camera and controller could track the person's facial image and overlay it onto video in real time, such that three trivia game players would see their own images and real time facial expressions presented on the television screen projected onto the bodies that were pre-recorded on the video, whether those bodies were the bodies of actors, animal bodies, robot bodies, animated bodies, no bodies, etc. Alternatively, once the facial image of the persons present have been captured and recorded, facial alteration software could be used to alter the facial images and expressions according to the action being displayed on the screen, such that the persons would see their own faces appearing on actors within the movie, with their own faces changing expression, speaking the lines of the movie, growing fangs and a beard when they drink a secret formula, or many other variations.

Other television quiz show games could also be implemented, such as phrase completion games. A user might select a vowel or letters from a scene menu. The proper phrase could be displayed on an interactive game unit's display.

Variations on popular game shows could be implemented. For example, instead of entering a correct textual answer in response to a trivial quiz show question, a game might allow a user to play a hand-eye coordination game on his interactive game unit instead. Point totals can be adjusted accordingly.

Non-television games could also be implemented. A murder mystery DVD could have interaction at certain scenes to allow users to choose their own adventure. For example, a user may wish to have his character check a dumpster for a murder weapon. Upon making a find, point totals can be adjusted accordingly.

The use of a separate DVD player lessens the component count, complexity, and cost to produce a game console. It allows a game console manufacturer to leverage the ubiquity of consumer DVD players by piggybacking on their commoditization, low price, and market acceptance.

Not incorporating a disk reader benefits manufacturers and retailers. It allows a manufacturer to avoid adding conventional DVD playing capabilities to its own system, a capability widely expected by consumers nowadays. It also avoids warranty issues associated with a DVD player component. With less moving parts, a game console without a disk reader will likely have a higher factory yield and a greater mean time between failure (MTBF) with consumers.

Not incorporating a disk reader and using a pre-existing DVD player also simplifies a user's entertainment center. There is one less place for a less sophisticated user, or a user who is simply unfamiliar with the entertainment center, to insert a disk. Because a game plays through a DVD player's existing television input mode (i.e. VIDEO1/VIDEO2, channel 3, etc.), a user has one less mode to check when trying to find where the game is playing than a traditional game console. A broader range of users are familiar with how their DVD player and remote controls work than a game console with its own separate controls.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention.

For example, in other embodiments each interactive game units may incorporate multiple displays and may communicate directly with one another. Other types of audio and video playback devices could be used other than video disks and video disk players. Although IR is a commonly used and convenient communication method, instead of communicating via IR the various units could communicate via radio frequency transmission, or by being wired together. Video displays could be used other than television sets, including computer monitors, RGB monitors, and the like. Although VBI data encoding and extraction circuits are well known and therefore convenient, game data and machine instructions could be encoded within the recorded media other than within the VBI data. Although the system may be conveniently and economically implemented using a game control unit 10 that is contained in a separate housing from the video playback device 40 as illustrated and described above, a DVD player or other video playback device could be incorporated within the same housing as the game control unit 10 in any of the embodiment discussed above thus eliminating the need for a separate video playback device.

Accordingly, it is to be understood that the detailed description and the accompanying drawings as set forth hereinabove are not intended to limit the breadth of the present invention, which should be inferred only from the following claims and their appropriately construed legal equivalents.

I claim:

1. An interactive entertainment system comprising:
   at least one input device;
   a control unit comprising:
      an input interface for receiving commands from said at least one input device;
      a signal formatter for receiving at least one received wireless signal from said input device, and for programming said control unit to produce output signals according to a detected communication protocol of said received wireless signal such that the output signals utilize the detected communication protocol of the received wireless signal; and
      a wireless transmitter that transmits said output signals according to said detected communication protocol, said output signals being capable of selectively controlling playback of portions of a separate video playback device utilizing the communication protocol of the input device; and
   a flexible signal wire external to said control unit and operatively connected at a first end thereof to said control unit, and operatively connected at a second and opposite end thereof to a wireless transmitting component;
   wherein said video playback device is a video disk player, and said output signals are wireless control signals which selectively control playback of selected portions of recorded content played on said video disk player.

2. The interactive entertainment system of claim 1 further comprising said video disk player, and wherein:
   said flexible signal wire is routed to said separate video disk player and is attached thereto in sufficiently close proximity to a wireless receiver of said video disk player to transmit said wireless control signals thereto.

3. The interactive entertainment system of claim 2 wherein said wireless transmitting component is an infrared transmitting diode that is affixed to a front face of said video disk player.

4. The interactive entertainment system of claim 1 further comprising:
   a video disk containing a recorded video signal and game data encoded within said video signal, said video disk being suitable for playing in said video disk player to reproduce said video signal.

5. An interactive entertainment system comprising:
   at least one input device;
   a control unit comprising:
      an input interface for receiving commands from said at least one input device;
      a signal formatter for receiving at least one received wireless signal from said input device, and for programming said control unit to produce output signals according to a detected communication protocol of said received wireless signal such that the output signals utilize the detected communication protocol of the received wireless signal; and
      a wireless transmitter that transmits said output signals according to said detected communication protocol, said output signals being capable of selectively controlling playback of portions of a separate video playback device utilizing the communication protocol of the input device;
   wherein said control unit receives a video signal produced by said separate video playback device, superimposes a video overlay onto said video signal according to input received from said at least one input device and according to data encoded within a video blanking interval (VBI) of said video signal, and outputs said video signal with said video overlay to a television set for display thereon.

6. The system of claim 5 wherein said control unit is contained in a housing that is separate from said video playback device.

7. The system of claim 5 wherein said control unit is contained in a housing that is separate from said video playback device, said housing further containing a display on which players' scores are displayed.

8. An interactive entertainment system comprising:
at least one player input device for receiving inputs from a plurality of players; and
a game unit operatively connected to said at least one player input device, said game unit comprising:
a video input port for receiving a video signal containing both video images and game data;
a player input port for receiving inputs from said at least one player input device;
scoring logic for awarding point values to players according to their respective inputs, and for keeping accumulated scores of said players;
a game data extraction section for extracting said game data from said video signal;
a video processing section for producing processed video, said processed video comprising at least said accumulated scores of said plurality of players;
a video switching section for switching a video display device to be selectively operatively connected to either said video images or to said processed video, such that said video display device selectively displays either said video images or said video images plus player score information.

9. The interactive entertainment system of claim 8 wherein said game unit sends command signals to a video playback device that command the video playback device to jump to specified prerecorded scenes on a recorded video medium.

10. An interactive entertainment system comprising:
at least one player input device, said input device outputting a wireless player command signal;
a game unit comprising:
a receiver for receiving said wireless player command signal;
a processor for controlling progression of a game;
an output port for outputting a video playback control signal, said video playback control signal selectively controlling which portion of a prerecorded video program will be played; and
logic for detecting a state of said game and, depending on said state of said game, in response to said wireless player command signal performing either the step of (a) sending a command to a video playback device to move an on-screen cursor, or (b) detecting which of a plurality of players responded first to a game event.

11. An interactive entertainment system comprising:
at least one input device;
a control unit comprising:
an input interface for receiving commands from said at least one input device;
a signal formatter for receiving at least one received wireless signal from said input device, and for programming said control unit to produce output signals according to a detected communication protocol of said received wireless signal such that the output signals utilize the detected communication protocol of the received wireless signal; and
a wireless transmitter that transmits said output signals according to said detected communication protocol, said output signals being capable of selectively controlling playback of portions of a separate video playback device utilizing the communication protocol of the input device;
a game controller having:
game control logic;
a first port operatively connected to said at least one input device;
a second port for receiving an input video signal and game data encoded therein from an external video source;
a third port for sending at least a portion of said video signal to an external video display device; and
audio signal circuitry for producing an audio signal according to progression of a game.

12. The interactive entertainment system according to claim 11 wherein said game controller further comprises:
a fourth port for sending said produced audio signal to said external video display device.

13. The interactive entertainment system according to claim 11 further comprising video program control means to selectively activate particular portions of a prerecorded video program to be played by said external video source.

14. An interactive entertainment system comprising:
at least one input device;
a control unit comprising:
an input interface for receiving commands from said at least one input device;
a signal formatter for receiving at least one received wireless signal from said input device, and for programming said control unit to produce output signals according to a detected communication protocol of said received wireless signal such that the output signals utilize the detected communication protocol of the received wireless signal; and
a wireless transmitter that transmits said output signals according to said detected communication protocol, said output signals being capable of selectively controlling playback of portions of a separate video playback device utilizing the communication protocol of the input device;
a game data extraction unit for receiving a video signal from said video playback device, the video signal containing video information and game data, and for extracting the game data; and
a plurality of interactive game units, each interactive game unit comprising:
a first display and at least one user input means associated therewith; and
response logic for determining whether an input received from said at least one user input is a correct input in response to the video information being shown on a second display, and for indicating on the first display that the user's input was correct.

15. The entertainment system of claim 14 wherein said game data extraction unit is contained within a separate housing from said video playback device.

16. The entertainment system of claim 14 wherein said game data extraction unit and said video playback device are integrated into the same housing.

17. The entertainment system of claim 16 wherein said video playback device is a video disk player.

18. The entertainment system of claim 14 further comprising:
recorded media having recorded thereon said video signal having said game data encoded therein.

19. The entertainment system of claim 18 further comprising:
a television set for receiving and displaying said video information; and
a remote control for sending commands to the video playback device.

20. The entertainment system of claim 14 wherein:
said game data extraction unit has a wireless transmitter for transmitting the game data to the interactive game unit, and the interactive game unit has a wireless receiver for receiving the game data.

21. The entertainment system of claim 14 wherein the response logic comprises scoring logic for determining a player's cumulative score and for posting said cumulative score on the interactive game unit's display.

22. In combination:
An interactive entertainment system comprising:
at least one input device;
a control unit comprising:
an input interface for receiving commands from said at least one input device;
a signal formatter for receiving at least one received wireless signal from said input device, and for programming said control unit to produce output signals according to a detected communication protocol of said received wireless signal such that the output signals utilize the detected communication protocol of the received wireless signal;
a wireless transmitter that transmits said output signals according to said detected communication protocol, said output signals being capable of selectively controlling playback of portions of a separate video playback device utilizing the communication protocol of the input device; and
a digital versatile disk (DVD) having machine instructions within video blanking intervals within video data stored on the DVD, wherein said machine instructions are associated with a video sequence on said DVD and said machine instructions cause multiple interactive game units to process data.

* * * * *